United States Patent
Kelly

(10) Patent No.: US 7,148,178 B2
(45) Date of Patent: Dec. 12, 2006

(54) COMBINATION OF A GUARD BED AND A COPPER-CONTAINING CATALYST BED

(75) Inventor: Gordon James Kelly, County Durham (GB)

(73) Assignee: Johnson Matthey PLC, London (GB)

( * ) Notice: Subject to any disclaimer, the term of this patent is extended or adjusted under 35 U.S.C. 154(b) by 30 days.

(21) Appl. No.: 10/524,477

(22) PCT Filed: Jul. 28, 2003

(86) PCT No.: PCT/GB03/03193

§ 371 (c)(1),
(2), (4) Date: Feb. 11, 2005

(87) PCT Pub. No.: WO2004/014546

PCT Pub. Date: Feb. 19, 2004

(65) Prior Publication Data

US 2005/0271580 A1 Dec. 8, 2005

(30) Foreign Application Priority Data

Aug. 13, 2002 (GB) ................................. 0218785.4

(51) Int. Cl.
*B01J 21/18* (2006.01)
*B01J 23/72* (2006.01)
*C01B 31/20* (2006.01)
*C01B 3/26* (2006.01)

(52) U.S. Cl. ...................... 502/184; 502/174; 502/180; 502/182; 423/437.1; 423/437.2; 423/648.1; 423/650; 423/651; 423/655; 423/656

(58) Field of Classification Search ................ 502/174, 502/180, 182, 184, 345, 346; 423/437.1, 423/437.2, 648.1, 650, 651, 655, 656
See application file for complete search history.

(56) References Cited

U.S. PATENT DOCUMENTS

| 4,849,576 A | 7/1989 | Nowack et al. |
| 4,849,577 A | 7/1989 | Boitiaux et al. |
| 2001/0027939 A1 | 10/2001 | Didillon et al. |
| 2002/0128329 A1* | 9/2002 | Watson ........................ 518/713 |
| 2004/0072682 A1* | 4/2004 | Watson ........................ 502/174 |

FOREIGN PATENT DOCUMENTS

| GB | 1 357 335 | 6/1974 |
| WO | WO-01/17674 A1 | 3/2001 |
| WO | WO-02/066156 A1 | 8/2002 |

* cited by examiner

*Primary Examiner*—Elizabeth D. Wood
(74) *Attorney, Agent, or Firm*—RatnerPrestia

(57) ABSTRACT

A catalyst bed combination comprising a bed of a particulate copper-containing catalyst and, upstream of the catalyst bed, a guard bed in the form of shaped units formed from lead oxide particles and a particulate support material. The guard bed extends the life of the copper catalyst by absorbing halide contaminants in the process stream.

7 Claims, No Drawings

COMBINATION OF A GUARD BED AND A COPPER-CONTAINING CATALYST BED

This application is the U.S. national phase application of PCT International Application No. PCT/GB2003/003193, filed Jul. 28, 2003, and claims priority of British Patent Application No. 0218785.4, filed Aug. 13, 2002.

FIELD OF THE INVENTION

This invention relates to catalyst bed combinations and in particular to copper catalysts and guard beds therefor.

BACKGROUND OF THE INVENTION

Copper catalysts are often employed for reactions involving hydrogen, for example simple hydrogenation reactions, e.g. the hydrogenation of aldehydes to alcohols, for methanol synthesis (where carbon oxides are reacted with hydrogen), methanol decomposition (where methanol, often in admixture with steam, is decomposed to form hydrogen and carbon oxides) and the shift reaction (where carbon monoxide is reacted with steam to produce hydrogen and carbon dioxide) and the reverse shift reaction. Often, in order to obtain the optimum activity and stability of the catalyst, the catalyst is made with the copper in a highly dispersed form, for example by precipitation of a copper compound in the presence of, or together with, one or more support materials, especially zinc, magnesium, chromium and/or aluminium compounds. Following such precipitation, the composition is heated to convert the copper compounds, and, if necessary also support materials, to the corresponding oxides. Prior to use for the desired reaction, the copper oxide is reduced to metallic copper. Particularly suitable catalysts for the above reactions are copper/zinc oxide/alumina and copper/zinc oxide/chromia compositions. In some cases part of the zinc may be replaced by magnesium and/or part of the alumina or chromia may be replaced by ceria or a rare earth such as lanthana.

The copper catalysts are readily de-activated by the presence of halide compounds and in particular chloride compounds, such as hydrogen chloride, in the process gas undergoing the reaction. Traces of such chloride compounds may arise from contaminants in the materials, for example hydrocarbon feedstock, steam, or air employed to make the process gas. Such chloride compounds react with the active copper, forming copper chloride. Since copper chloride is relatively low melting, at the temperatures at which the catalysts are commonly employed, e.g. 150–300° C., the copper is mobilised and tends to aggregate resulting in a loss of dispersion of the copper and consequent loss of activity of the catalyst. Also where zinc and/or magnesium oxide is a component of the catalyst, likewise the corresponding chlorides may be formed, and these likewise are liable to be mobilised resulting in loss of the stabilising effect of the zinc or magnesium oxides, again with the consequent loss of dispersion and activity of the copper.

It has been proposed in PCT application WO 01/17674 to employ a guard bed upstream of the copper catalyst wherein the guard bed is a particulate composition containing a lead compound and a support therefor. That application discloses that the guard bed particles may be made by impregnating particles of the support with a solution of a suitable lead salt, for example lead nitrate, by precipitating an appropriate lead compound in the presence of particles of the support material, or by co-precipitating a lead compound and the support, or a precursor to the support. The preferred lead compound was lead nitrate. However, there is a risk when using lead nitrate that, in the event of a plant upset, water may condense on the guard bed and leach the lead nitrate from the support and wash it on to the downstream copper catalyst. Lead compounds tend to poison copper catalysts and so there is the risk that the activity of the copper catalysts may be diminished. For this reason it may be preferable to use a lead compound that is not soluble in water.

In the aforementioned PCT application WO 01/17674 a commercial lead oxide supported on alumina and containing 20.4% by weight of lead was found to be a poor guard bed material compared to other lead compounds tested, providing activity only marginally better than alumina granules.

SUMMARY OF THE INVENTION

We have found that shaped units suitable for use as guard beds can be made simply from finely divided lead oxide particles and particles of a support material.

Accordingly the present invention provides a catalyst bed combination comprising a bed of a particulate copper-containing catalyst and, upstream of the catalyst bed, a guard bed of shaped units formed from lead oxide particles and a particulate support material.

DETAILED DESCRIPTION OF THE INVENTION

By "lead oxide" we mean oxidic lead compounds including partially hydrated lead oxides. Such compounds include $PbO$, $Pb_3O_4$ and $PbO_2$. Preferably the lead oxide is $PbO$. Particularly the lead oxide particles have an average (by weight) particle size below 50 µm, more particularly 25 µm, and preferably substantially all the particles have a size below 120 µm. The guard bed is in the form of shaped units: these preferably have maximum and minimum dimensions in the range 1.5 to 20 mm, particularly 3 to 6 mm. The aspect ratio of the shaped units, i.e. the ratio of the maximum to minimum dimensions, is preferably less than 2.

The shaped units may be of regular shape, e.g. spheres, cylinders etc. and may be made by a "dry" technique wherein a powder composition comprising particulate lead oxide and particulate support material is compacted to the desired shape, in e.g. a pelleting machine, or a "wet" method wherein the powder composition is mixed with a suitable liquid to form a paste which is then extruded to the desired cross section and the extrudate is cut or broken into units of the requisite length. A granulation method may alternatively be employed wherein the powder composition is mixed with a small amount of liquid, often water, insufficient to give a paste, and the resulting damp mixture granulated or pelletised by means of a pellet mill, for example of the type used for pelleting animal feedstuffs, wherein the mixture to be pelleted is charged to a rotating perforated cylinder through the perforations of which the mixture is forced by a bar or roller within the cylinder. The resulting extruded mixture is cut from the surface of the rotating cylinder by a doctor knife positioned to give pellets of the desired length. Alternatively, granulated materials may be used as the feed for a pelleting machine. Depending upon the moisture content, granulated materials may be used as the feed for a pettleting machine. Depending upon the moisture content, granulated materials may or may not be dried before use. Furthermore it may be desirable to calcine the shaped units. By the term "calcine" we mean heating in an oxygen-containing gas such as air to temperatures above 200° C.

The shaped units are formed from a mixture of the lead oxide particles and particles of a support material. By the term "support material" we mean finely divided support particles of an inert material. Suitable inert materials include alumina, hydrated alumina, chromia, zirconia, titania, or, less preferably, silica. Alumina, hydrated alumina and mixtures of these are the preferred support materials. Most preferably, the support materials are hydrated aluminas such as alumina trihydrate ($Al(OH)_3$) and Boehmite ($AlO(OH)$) and mixtures of these. The hydrated aluminas preferably have an average by weight particle size below 100 μm, more particularly below 50 μm, and preferably substantially all the particles have a size below 200 μm. We have found that mixtures of two or more hydrated aluminas can provide shaped units with better physical properties, for example crush strength. Where mixtures of two hydrated aluminas are used, the relative amounts may be varied by weight in the range 10:90 to 90:10, preferably 60:40 to 40:60.

Whichever shaping method is used to form the shaped units, a processing aid such as a lubricant and/or a binder may be incorporated into the powder composition. Lubricants, which may be employed when a "dry" processing route such as pelleting is used, include graphite, fatty acids and salts thereof such as stearates. A preferred lubricant is graphite. Binders that may be used may be inorganic, for example a clay, e.g. attapulgite, bentonite, sepiolite or colloidal magnesium aluminium silicate, or a cement, e.g. a calcium aluminate cement, or organic, e.g. a soluble carbohydrate such as starch, alginate or xanthan gum; a cellulose ether, e.g. hydroxy methyl cellulose; a protein; a polyvinyl alcohol, ester, acetal, or ether or mixed derivative e.g. a partially hydrolysed polyvinyl acetate; a polyalkylene oxide; a polyacrylate or methacrylate; or polyacrylamide or polymethacrylamide. Organic binders, if used, are preferred.

The amount of processing aid employed may be 0.5 to 10%, particularly 1 to 5%, by weight, based upon the combined weights of the lead compound, support and processing aid. Preferred compositions contain a processing aid, particularly a lubricant such as graphite. Hence particularly preferred shaped units are formed from lead oxide, hydrated alumina and graphite.

Preferred compositions have a lead content of 5 to 75%, particularly 10 to 60%, more particularly 30 to 75% and especially 40 to 75% by weight of lead (expressed as metal) and based upon the combined weights of the lead compound, support, and if present, lubricant and/or binder. By providing a guard bed of shaped units formed from lead oxide particles and a particulate support material, the shaped units may advantageously contain higher loadings of lead oxide than generally possible using impregnation techniques. The particulate support material also provides the shaped units with improved surface area and porosity than possible with just particles of lead oxide.

A further advantage of using shaped units comprising particulate lead oxide, support material and lubricant, such as graphite is that the shaped units need not be dried or calcined before use. However, if an organic binder is used, then irrespective of whether a wet or dry shaping method is employed, the shaped units are preferably calcined in air to burn out the binder. An advantage of using lead oxide rather than other lead compounds such as lead carbonate or basic lead carbonate is its higher thermal stability that allows higher temperatures to be used to burn out the binder. Preferably temperatures greater than 200° C. and more preferably greater than 400° C. may be used.

The guard bed and the catalyst bed are used as fixed beds and may be in the same vessel or in different vessels, with the guard bed upstream of the catalyst bed. Preferably process gas flows down through the catalyst bed: thus where the guard and catalyst beds are in the same vessel, the guard bed may be a layer of the guard bed particles on top of the catalyst bed particles. If desired there may be a layer of an inert material, e.g. alumina spheres or rings, between the guard bed and the catalyst bed to facilitate replenishment of the guard bed without disturbing the catalyst bed.

The guard bed is effective for absorbing chloride compounds from the process gas, particularly where chloride compounds are present in an amount greater than 0.5 ppm by volume. By absorbing chloride compounds, the lifetime of the copper-containing catalyst may be usefully extended.

Therefore according to a further aspect of the invention we provide a process for performing a catalytic reaction using a bed of a copper-containing catalyst, comprising passing a process gas through a guard bed of shaped units formed from particles of lead oxide and a particulate support material and then passing said process gas through the bed of copper-containing catalyst.

The invention is of particular utility in relation to the shift reaction. In this process a process gas stream containing carbon monoxide and steam, and often other components such as hydrogen, carbon dioxide, methane, and/or nitrogen, is passed through a bed of the copper-containing catalyst, especially a copper/zinc oxide/alumina or copper/zinc oxide/chromia catalyst in which some of the zinc oxide may be replaced by magnesia and/or some of the alumina and/or chromia may be replaced by a rare earth, at a temperature in the range 150 to 300° C., especially at an inlet temperature in the range 150 to 250° C. The process gas preferably contains 1 to 4% by volume of carbon monoxide, and at least one mole of steam per mole of carbon monoxide. Preferably the process gas contains 20 to 50% by volume of steam. Typically the process is operated at a wet gas space velocity in the range 2000 to 5000 $h^{-1}$, and at pressures ranging from atmospheric to 50 bar abs.

In addition to absorbing chloride compounds, it will be appreciated that the shaped units will also absorb sulphur compounds and so the bed will also act as a sulphur guard bed.

The invention is further illustrated by the following examples.

EXAMPLE 1

Samples of chloride absorbent were made from lead oxide (PbO) and hydrated alumina powders. The lead oxide powder of Example 1(a) had a weight average particle size of 13.6 μm with essentially all of the particles having a size in the range 6.3 to 29.4 μm. The lead oxide powder of Example 1(b) had a weight average particle size of 8.5 μm with essentially all of the particles having a size in the range 3.6 to 19.5 μm. The alumina trihydrate ($Al(OH)_3$) powder had a BET surface area of 0.5 $m^2/g$ and a weight average particle size of 21 μm with essentially all of the particles having a size in the range 5.1 to 54.3 μm. The Boehmite ($AlO(OH)$) powder had a BET surface area of 228 $m^2/g$ and a weight average particle size of 31.2 μm with essentially all of the particles having a size in the range 5.8 to 71.2 μm.

(a) 60 g of alumina trihydrate powder was mixed for 5 min with 40 g of the lead oxide powder and 2 g of graphite as a lubricant and the mixture formed into squat cylindrical pellets of 25 mm diameter and 10–20 mm height using a pelleting machine at load of 20 tons. The pellets had a nominal lead content of 36.4% by weight and a density of about 3.5 g/ml.

(b) 292 g of alumina trihydrate powder and 233 g of Boehmite powder were mixed for 5 min with 475 g of the lead oxide powder and 10 g of graphite as a lubricant and the mixture formed into squat cylindrical pellets of 62.5 mm diameter and 10–20 mm height using a pelleting machine at load of 20 tons. The pellets had a nominal lead content of 43.7% by weight and a density of about 3.5 g/ml.

EXAMPLE 2

The guard bed materials of Example 1 were tested by charging 0.50 g (about 0.4 ml) of particles of a copper oxide/zinc oxide/alumina low temperature shift catalyst precursor containing about 50% by weight of copper oxide and having a particle size in the range 0.6–1.0 mm to a microreactor with 0.25 g (about 0.1 ml) of particles of fused alumina of particle size 0.6–1.0 mm disposed as a layer on top of the shift catalyst precursor and 0.2 ml (about 0.36 g) of the guard material particles of particle size 0.6–1.0 mm on top of the fused alumina particles to give a total catalyst bed of volume of about 0.70 ml. (Prior to testing, the pellets of guard bed material were broken down to particles of size 0.6–1 mm).

The copper oxide in the catalyst precursor was reduced to metallic copper by passing a stream of nitrogen containing 2% by volume of hydrogen down through the microreactor at a pressure of about 28 bar abs. at a flow rate of 15 litres/hour (at NTP) while the microreactor was heated from ambient temperature to 220° C. and held at this temperature for 95 minutes to give a total reduction time of 3.5 hours.

The catalyst activity for the water gas shift reaction was determined by passing 50 litres/hour (at NTP) of a gas mixture comprising 1 part by volume of steam to 2 parts by volume of a gas of volume composition $H_2$ 55%, $CO_2$ 15%, CO 5%, and $N_2$ 25% through the microreactor at a temperature of 220° C. and a pressure of about 28 bar abs.

To simulate chloride compound contamination, after the gas mixture had been passed through the catalyst bed for about 6 hours, hydrogen chloride (HCl) was added to the gas mixture to give an HCl concentration in the wet gas of 1 ppm by volume. Under these fixed test conditions, the variation of CO conversion with time on line was measured using in-line infra-red detection. A decrease in CO conversion with time is indicative of loss of activity of the catalyst.

For purposes of comparison the following guard beds were also tested using the same method
Ex 2(a) a bed of the low-temperature shift catalyst,
Ex 2(b) a bed comprising a commercially available absorbent comprising lead oxide on alumina having a nominal lead content of about 20.5% by weight, and
Ex 2(c) a bed comprising lead oxide supported on alumina particles prepared by impregnation as follows; 303 g of gamma alumina particles of size 0.6–1.0 mm and having a BET surface area of 350 $m^2/g$ was dipped in 800 ml of an aqueous solution of lead(II) nitrate at 60 to 70° C. and of approximate concentration 55 g of lead(II) nitrate per 100 ml of solution. The material was removed from the solution after 30 minutes, drained, dried at 110° C. for two hours and then calcined in an oven at 300° C. for two hours. The above process was repeated using the calcined lead nitrate impregnated alumina prepared as above and a fresh quantity of the lead nitrate solution. After calcination at 300° C., the resultant material was re-dipped for a third time, again using a fresh amount of the lead nitrate solution. After calcination at 300° C. for two hours the material had a lead content of 25.5% by weight. A portion of the material was then further calcined at 550° C. for two hours to decompose lead nitrate to lead oxide and yield a product with a lead content of 28.7% by weight. The increase in lead content indicates that lead oxide has formed.

Since the material of Example 2(b) had a significantly lower bulk density than the materials of Example 1, in this case a similar volume (about 0.2 ml) of absorbent was used but its weight was only about 0.19 g.

The % CO conversion was determined for a period of several days with measurements being taken at regular intervals. To assist comparison, the CO conversion measurements were plotted against time-on-line and a smooth curve drawn through the points for each sample. (The individual points showed little variance from the smooth curves). From these plots, the conversion every 24 hours was determined and the results are shown in the following Table wherein the % CO conversion figures have been rounded to the nearest integer.

| Time on line | CO Conversion (%) | | | | |
|---|---|---|---|---|---|
| | | | Comparative Examples | | |
| (days) | Ex 1(a) | Ex 1(b) | Ex 2(a) | Ex 2(b) | Ex 2(c) |
| 1 | 84 | 84 | 84 | 85 | 86 |
| 2 | 81 | 81 | 79 | 81 | 85 |
| 3 | 79 | 79 | 75 | 72 | 77 |
| 4 | 78 | 77 | 62 | 50 | 57 |
| 5 | 76 | 76 | 34 | 7 | 13 |
| 6 | 75 | 75 | 3 | 0 | 0 |
| 7 | 74 | 73 | 0 | 0 | 0 |
| 8 | 74 | 67 | 0 | 0 | 0 |
| 9 | 71 | 42 | 0 | 0 | 0 |
| 10 | 57 | 0 | 0 | 0 | 0 |

The results demonstrate that the guard bed materials comprising particles of lead oxide and a particulate support are superior to commercial supported PbO and a supported PbO-containing material prepared by impregnation.

EXAMPLE 3

A range of supported lead oxide guard bed materials was prepared according to the method of Example 1(b) with compositions as follows;

| Sample | PbO (g) | Alumina trihydrate (g) | Boehmite (g) | Graphite (g) | Nominal Pb content (%) |
|---|---|---|---|---|---|
| Example 3 (a) | 18.75 | 17.5 | 14 | 0.5 | 34.3 |
| Example 3 (b) | 28.5 | 12 | 9.5 | 0.5 | 52.4 |
| Example 3 (c) | 33.5 | 9.25 | 7.25 | 0.5 | 61.6 |

Testing was carried out according to the method of Example 2. The results are as follows.

| Time on Line (days) | CO Conversion (%) | | |
|---|---|---|---|
| | Example 3(a) | Example 3(b) | Example 3(c) |
| 1 | 85 | 85 | 86 |
| 2 | 83 | 82 | 83 |

-continued

| Time on Line (days) | CO Conversion (%) | | |
|---|---|---|---|
| | Example 3(a) | Example 3(b) | Example 3(c) |
| 3 | 79 | 79 | 80 |
| 4 | 78 | 78 | 79 |
| 5 | 74 | 76 | 76 |
| 6 | 68 | 76 | 76 |
| 7 | 42 | 75 | 76 |
| 8 | 2 | 72 | 73 |
| 9 | 0 | 52 | 66 |
| 10 | 0 | 17 | 50 |

The results demonstrate the particular effectiveness of the higher lead oxide-containing materials.

The invention claimed is:

1. A catalyst bed combination comprising a bed of a particulate copper-containing catalyst and, upstream of the catalyst bed, a guard bed of shaped units wherein the guard bed shaped units are formed by mixing lead oxide particles and a mixture of two or more particulate hydrated aluminas.

2. A combination according to claim 1 wherein the shaped units are formed from a composition containing a processing aid.

3. A combination according to claim 1 wherein the shaped units have a lead content of 5 to 75%, by weight of lead (expressed as metal).

4. A combination according to claim 1 wherein the shaped units have a lead content of 30 to 75%, by weight of lead (expressed as metal).

5. A combination according to claim 2 wherein the processing aid is graphite.

6. A combination according to claim 1 wherein the lead oxide used to form the shaped units has an average (by weight) particle size below 50 μm.

7. A process for performing a catalytic shift reaction comprising passing a process gas through a guard bed of shaped units and then contacting the gas with a copper-containing catalyst wherein the guard bed shaped units are formed by mixing lead oxide particles and a mixture of two or more particulate hydrated aluminas.

* * * * *